(12) United States Patent
Lee et al.

(10) Patent No.: US 7,158,173 B2
(45) Date of Patent: Jan. 2, 2007

(54) METHOD FOR DETERMINING ENVIRONMENTAL BRIGHTNESS TO CONTROL DISPLAY BRIGHTNESS IN MOBILE COMMUNICATION TERMINAL INCLUDING CAMERA HAVING AUTOMATIC GAIN CONTROL FUNCTION, AND METHOD FOR CONTROLLING DISPLAY BRIGHTNESS USING THE SAME

(75) Inventors: Seung-Cheol Lee, Seoul (KR); Sang-Ki Yu, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 910 days.

(21) Appl. No.: 10/270,959

(22) Filed: Oct. 15, 2002

(65) Prior Publication Data
US 2003/0081133 A1 May 1, 2003

(30) Foreign Application Priority Data
Oct. 31, 2001 (KR) .............................. 2001-67479

(51) Int. Cl.
*H04N 5/228* (2006.01)
(52) U.S. Cl. .............................. 348/222.1; 348/333.01
(58) Field of Classification Search ..................... None
See application file for complete search history.

(56) References Cited
U.S. PATENT DOCUMENTS

| | | | | |
|---|---|---|---|---|
| 5,325,195 | A * | 6/1994 | Ellis et al. .................. | 348/189 |
| 6,292,228 | B1 | 9/2001 | Cho | |
| 6,452,582 | B1 * | 9/2002 | Rolston ....................... | 345/102 |
| 6,570,611 | B1 * | 5/2003 | Satou et al. ................. | 348/189 |
| 6,727,489 | B1 * | 4/2004 | Yano .......................... | 250/221 |
| 6,744,464 | B1 * | 6/2004 | Huang ........................ | 348/182 |

FOREIGN PATENT DOCUMENTS

| | | |
|---|---|---|
| JP | 11 027587 | 12/1999 |
| KR | 1998-013821 | 5/1998 |
| KR | 1999-000122 | 1/1999 |
| KR | 2000-032894 | 6/2000 |

OTHER PUBLICATIONS

European Search Report dated Feb. 6, 2003, issued in a counterpart application, namely, Appln. No. 02024299.6.

* cited by examiner

*Primary Examiner*—Ngoc-Yen Vu
*Assistant Examiner*—Hung H. Lam
(74) *Attorney, Agent, or Firm*—The Farrell Law Firm (57) ABSTRACT

Disclosed is a method for determining environmental brightness to appropriately control display brightness according to variations of the environmental brightness in different places in a mobile communication terminal including a camera having an automatic gain control (AGC) function, and a method for controlling the display brightness using the same, including the steps of calculating a luminance average of a center region of a photographed screen corresponding to an AGC reference region and a luminance average of an edge region except for the center region as brightness values from an image signal generated by photographing of the camera, comparing the brightness value of the edge region with a previously-set dark environmental critical value, comparing the brightness value of the center region with the brightness value of the edge region according to the comparison result, and determining that the environmental brightness is one of the bright state and the dark state, extracting luminance elements from an image signal which will be transmitted to a display, calculating a histogram of the luminance elements, and performing brightness contrast stretching, controlling the display brightness by adding or subtracting a previously-set control value to/from the brightness contrast stretched pixels according to the determined environmental brightness, and replacing the brightness-controlled luminance elements by the luminance elements of the image signal which will be transmitted to the display.

13 Claims, 8 Drawing Sheets

METHOD FOR DETERMINING ENVIRONMENTAL BRIGHTNESS TO CONTROL DISPLAY BRIGHTNESS IN MOBILE COMMUNICATION TERMINAL INCLUDING CAMERA HAVING AUTOMATIC GAIN CONTROL FUNCTION, AND METHOD FOR CONTROLLING DISPLAY BRIGHTNESS USING THE SAME

PRIORITY

This application claims priority to an application entitled "Method For Judging Environmental Brightness To Control Display Brightness In Mobile Communication Terminal Including Camera Having Automatic Gain Control Function, And Method For Controlling Display Brightness Using The Same" filed in the Korean Industrial Property Office on Oct. 31, 2001 and assigned Serial No. 2001-67479, the contents of which are hereby incorporated by reference.

BACKGROUND OF THE INVENTION

1. Field of the Invention

The present invention relates generally to a mobile communication terminal which includes a camera having an automatic gain control (AGC) function, and in particular, to a method for judging environmental brightness and controlling display brightness.

2. Description of the Related Art

Recently, a mobile communication terminal which not only displays motion pictures but also transmits/receives images through a camera has been developed. The camera for the mobile communication terminal is an image pickup device such as a charge coupled device (CCD) and a complementary metal oxide semiconductor (CMOS), and has an AGC function. The AGC function automatically controls light, so that a luminance average of an image for an AGC reference region set up in the center region of a photographed screen can exist within a predetermined range. It is thus possible to sense a subject in a bright or dark environment. The AGC function will now be briefly explained. An average of the luminance values of image signals sensed by sensors installed in the center region corresponding to the AGC reference region among the sensors of the image pickup device is calculated and confirmed to exist in or exceed a predetermined critical range. Thereafter, an iris is controlled to increase or decrease light, so that the average of the luminance values can exist within the critical range. When the average of the luminance values is greater than an upper limit value of the critical range, light is decreased. When it is les than a lower limit value of the critical range, light is increased. By repeating the procedure, an optimal image of the subject can be obtained in a bright or dark place.

On the other hand, the above-described mobile communication terminal uses a liquid crystal display (LCD) as a display device. The display brightness of the LCD seems different to a user according to the environmental brightness. In the case of a portable terminal carried by a user, the environmental brightness varies considerably. Accordingly, in order for the user to clearly see the image displayed on the LCD screen, the display brightness of the LCD must be appropriately controlled according to the environmental brightness. For example, the display brightness should be increased in a dark place.

Exemplary techniques for controlling display brightness include Korea Patent Publication Nos. 1998-013821 'Apparatus For Automatically Controlling Brightness Of Liquid Crystal Display' (May 15, 1998), 1999-000122 'Method For Automatically Controlling Brightness Of Screen Of Liquid Crystal Display' (Jan. 15, 1999), and 2000-0032894 'Method For Automatically Controlling Brightness Of Monitor Of Image Telephone' (Jun. 15, 2000). Here, Korea Patent Publication No. 1998-013821 suggests a method for sensing the environmental rightness by using a solar cell, and automatically controlling the brightness of a ear-side light and a tilt so as to control the brightness of the LCD of a view finder of a camera. In addition, Korea Patent Publication No. 1999-000122 discloses a method for sensing luminous intensity by using an open/close state of an iris in a camcorder having the LCD, and automatically controlling the rightness, contrast and colors of the LCD screen, so that users can clearly see a subject. Korea Patent Publication No. 2000-0032894 teaches a method for interpreting a luminance signal level of an image photographed by a camera in an image telephone without using a luminance sensor, determining the environmental brightness, obtaining the optimal LCD brightness according to the result, and variably controlling the brightness of an LCD monitor.

As described above, the display brightness of the LCD is automatically controlled according to the environmental brightness. However, Korea Patent Publication No. 1998-013821 does not relate to the display of the mobile communication terminal, and requires a solar cell and a related circuit for sensing the environmental brightness. Moreover, since the environmental brightness is sensed merely by the light sensed by the solar cell, the display brightness may be inappropriately controlled. For example, when the solar cell is installed in front of the LCD and a bright light source is located behind the LCD, the solar cell determines the environmental brightness as a bright state by sensing light reflected by the user. But the user sees the LCD screen relatively dark.

In addition, when it is presumed that a method for sensing the luminous intensity according to an open/close state of an iris, or determining the environmental brightness on the basis of a luminance signal level of an image photographed by a camera is applied to a mobile communication terminal including a camera having the AGC function, the AGC function fails to precisely determine the environmental brightness. That is, although a subject and a background often have different brightness in the mobile communication terminal environment, the AGC function controls the light to exist within the critical range only in the AGC reference region which is part of the whole screen, thereby relatively distorting the environmental brightness. For instance, in a backlight state, the environmental brightness is high but the subject doesn't look clearly. Therefore, the AGC function opens the iris more and increases light to brighten the subject. In this case, if the luminous intensity of the environment is sensed according to the open/close state of the iris, the environmental brightness is misdetermined as the dark state. In addition, when the environmental brightness is determined according to the luminance signal level of the whole screen of the image photographed by the camera, if a bright light source is positioned in front of a subject, the subject looks bright due to the light reflected by the subject. The AGC function closes the iris more and decreases light to darken the subject, thereby decreasing the luminance signal level of the whole screen. As a result, the environmental brightness is misdetermined as the dark state.

SUMMARY OF THE INVENTION

It is, therefore, an object of the present invention to provide a method for determining environmental brightness to appropriately control display brightness according to variations of environmental brightness in different places in a mobile communication terminal including a camera having an AGC function.

It is another object of the present invention to provide a method for controlling display brightness by determining environmental brightness to appropriately control the display brightness according to variations of the environmental brightness in a mobile communication terminal including a camera having an AGC function.

To achieve the above objects, there is provided a method for determining environmental brightness in a portable terminal including a camera having an AGC function for automatically controlling light so that a luminance average of an image for an AGC reference region set up in a photographed screen can exist within a predetermined range, including the steps of: calculating a luminance average of a center region of the photographed screen corresponding to the AGC reference region and a luminance average of an edge region except for the center region as brightness values from an image signal generated by photographing of the camera; and comparing the brightness value of the edge region with a previously-set dark environmental critical value, comparing the brightness value of the center region with the brightness value of the edge region according to the comparison result, and determining that the environmental brightness is one of the bright state and the dark state.

In another aspect of the present invention, there is provided a method for controlling display brightness including the steps of: extracting luminance elements from an image signal which will be transmitted to a display; calculating a histogram of the luminance elements, and performing brightness contrast stretching; controlling the display brightness by adding or subtracting a previously-set control value to/from the brightness contrast stretched pixels according to environmental brightness determined by the method for determining the environmental brightness; and replacing the brightness-controlled luminance elements by the luminance elements of the image signal which will be transmitted to the display.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
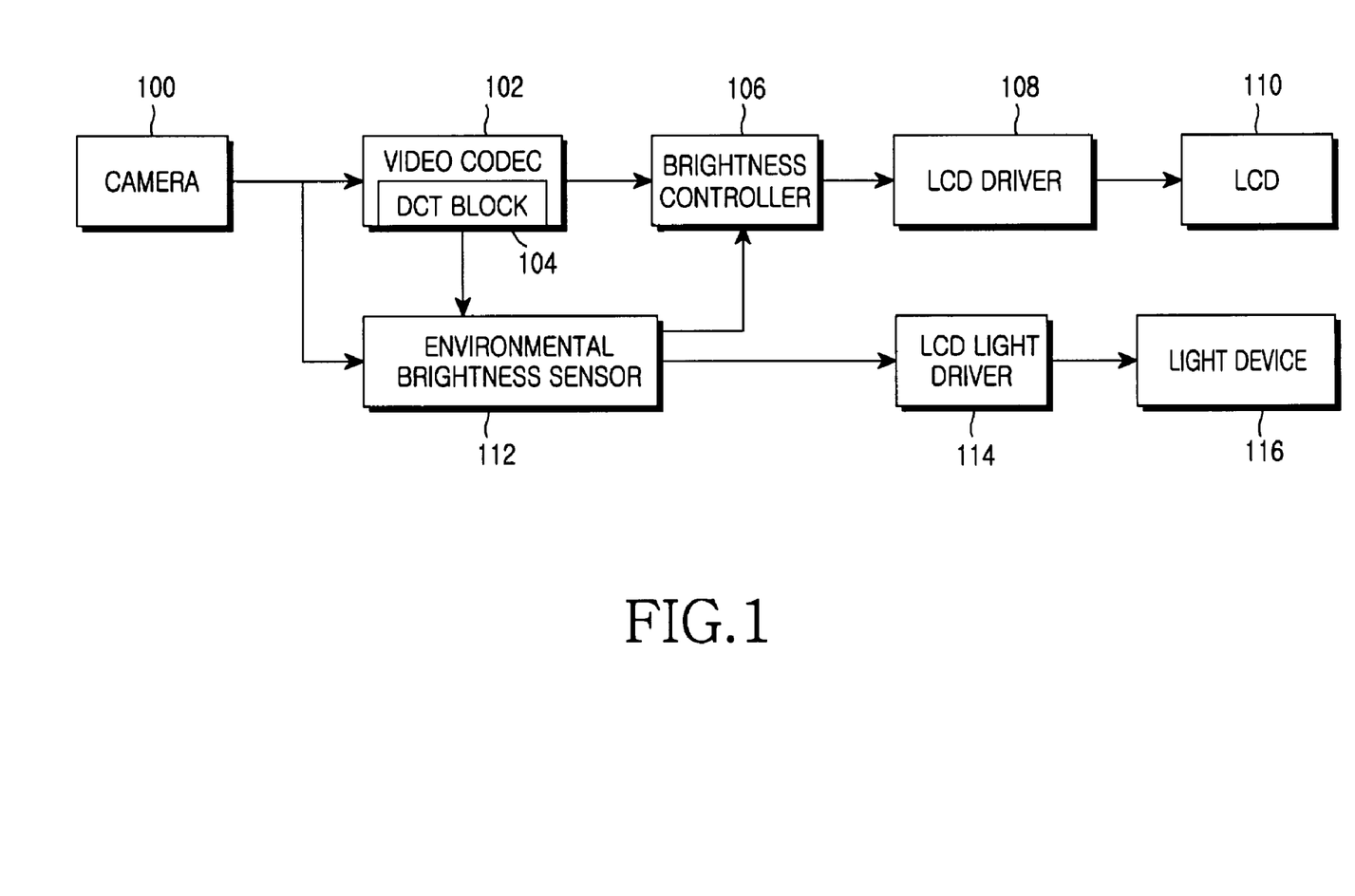
FIG. 1 is a block diagram illustrating an apparatus for determining environmental brightness in order to control display brightness, and controlling the display brightness in accordance with a preferred embodiment of the present invention.

FIG. 1 is a block diagram illustrating an apparatus for determining environmental brightness in order to control display brightness, and controlling the display brightness in accordance with the preferred embodiment of the present invention. As illustrated in FIG. 1, a mobile communication terminal including a camera 100 having an AGC function determines the environmental brightness by an environmental brightness sensor 112, controls the display brightness of an LCD 110 by a brightness controller 106 according to the judged environmental brightness, and controls a light device 116 for providing light to the LCD 110. In general, the camera 110 is installed at the upper portion of the LCD 110 in the mobile communication terminal. An image signal generated by photographing of the camera 100 is transmitted to a video coder/decoder (CODEC) 102 and the environmental brightness sensor 112.

The video CODEC 102 is generally a standard video CODEC including a video encoder and a video decoder using a video compression and encoding method such as MPEG-1 (Moving Picture Expert Group-1), MPEG-2, MPEG-4, H.261, H.263 and H.26L. The video encoder of the video CODEC 102 compresses and encodes the image signal from the camera 100, and the video decoder decodes the encoded image signal into the original one. In order to display an image photographed by the camera 100 on the LCD 110, the image signal generated by the camera 100 is processed by the video CODEC 102, and then transmitted to an LCD driver 108. Thus, the image is displayed on the screen of the LCD 110. On the other hand, the video CODEC 102 using the video compression and encoding method such as MPEG-1, MPEG-2, MPEG-4, H.261, H.263 and H.26L uses discrete cosine transform (DCT). The video encoder has a DCT block 104, and thus the compression and encoding process includes a DCT process. In addition, the video decoder has an inverse discrete cosine transform (IDCT) block (not shown), and thus the decoding process includes an IDCT process.

As described below, the environmental brightness sensor 112 calculates a luminance average of a center region of a photographed screen corresponding to an AGC reference region and a luminance average of an edge region except for the center region as brightness values from the image signal generated by photographing of the camera 100, and determines the environmental brightness on the basis of the luminance averages. Considering that the image inputted from the camera 100 and located in the center region which becomes the AGC reference region by the AGC function has a brightness value within a predetermined range, the environmental brightness sensor 112 compares the brightness value of the center region with the brightness value of the edge region, and determines the environmental brightness of a subject. Only the luminance values are used for determination of the environmental brightness because chrominance of the image has restrictions of the light and shade in the subject itself. The luminance information has less restrictions than the chrominance information.

Figure 2:
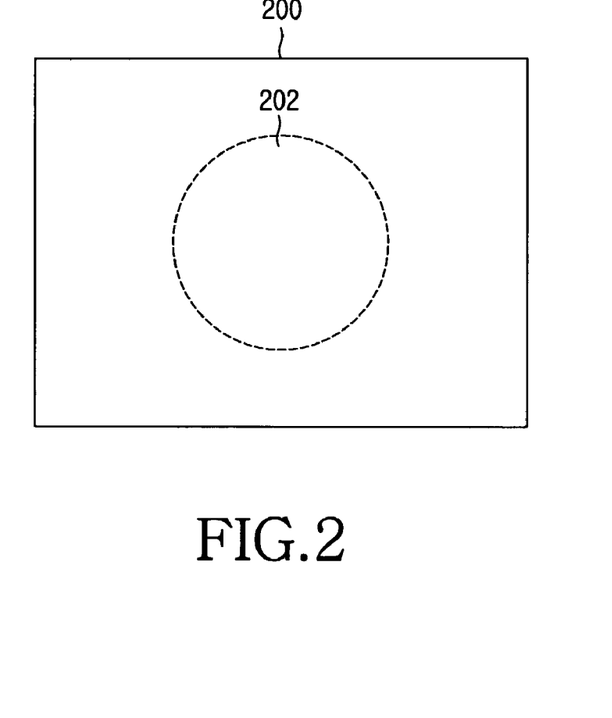
FIG. 2 is an exemplary diagram illustrating divided regions of a screen for the AGC in a general camera having an AGC function.
Figure 3:
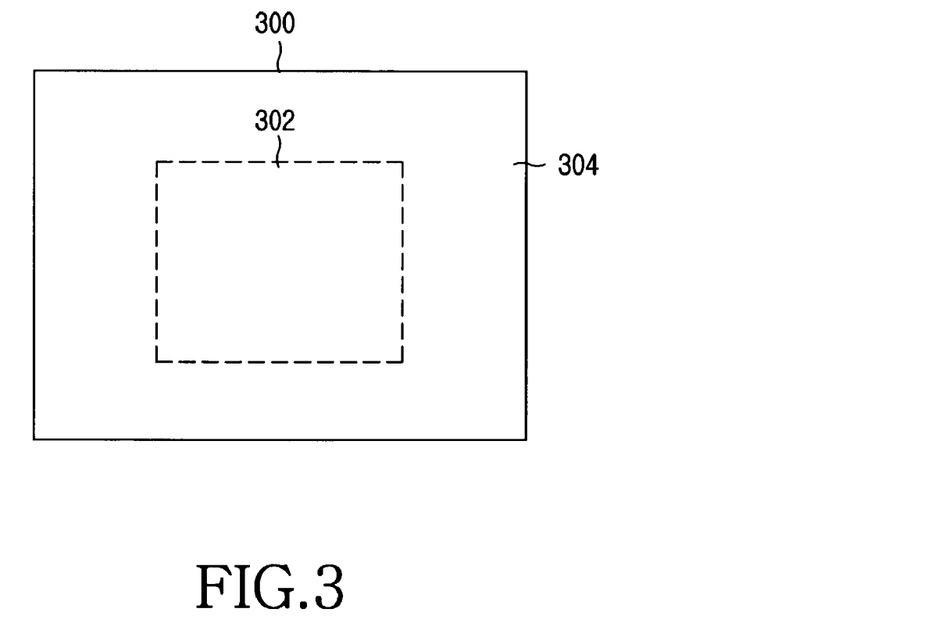
FIG. 3 is an exemplary diagram illustrating divided regions of a screen in accordance with the preferred embodiment of the present invention.

The regions of the screen for the AGC in the camera 100 having the AGC function is shown in FIG. 2, and a center region of the whole screen 300 as shown in FIG. 3 is set up as a center region 302 to correspond to the AGC reference region 202 set up in the center of the whole screen 300, and the remaining region is set up as an edge region 304. In FIG. 3, a size of the center region 302 is a quarter of the whole screen 300. It should be recognized that FIG. 3 shows one example and thus a size, position and shape of the center region 302 are varied according to the AGC property of the camera 100.

The environmental brightness sensor 112 calculates the brightness value of the center region 302 and the brightness value of the edge region 304 directly from the image signal inputted from the camera 100, or by using a DCT DC coefficient of the luminance block obtained from the DCT block 104 of the video encoder of the video CODEC 102. For this, the environmental brightness sensor 112 preferably employs a special central processing unit (CPU), instead of using a main control unit of the mobile communication terminal, for example a mobile system modem chip.

Figure 4:
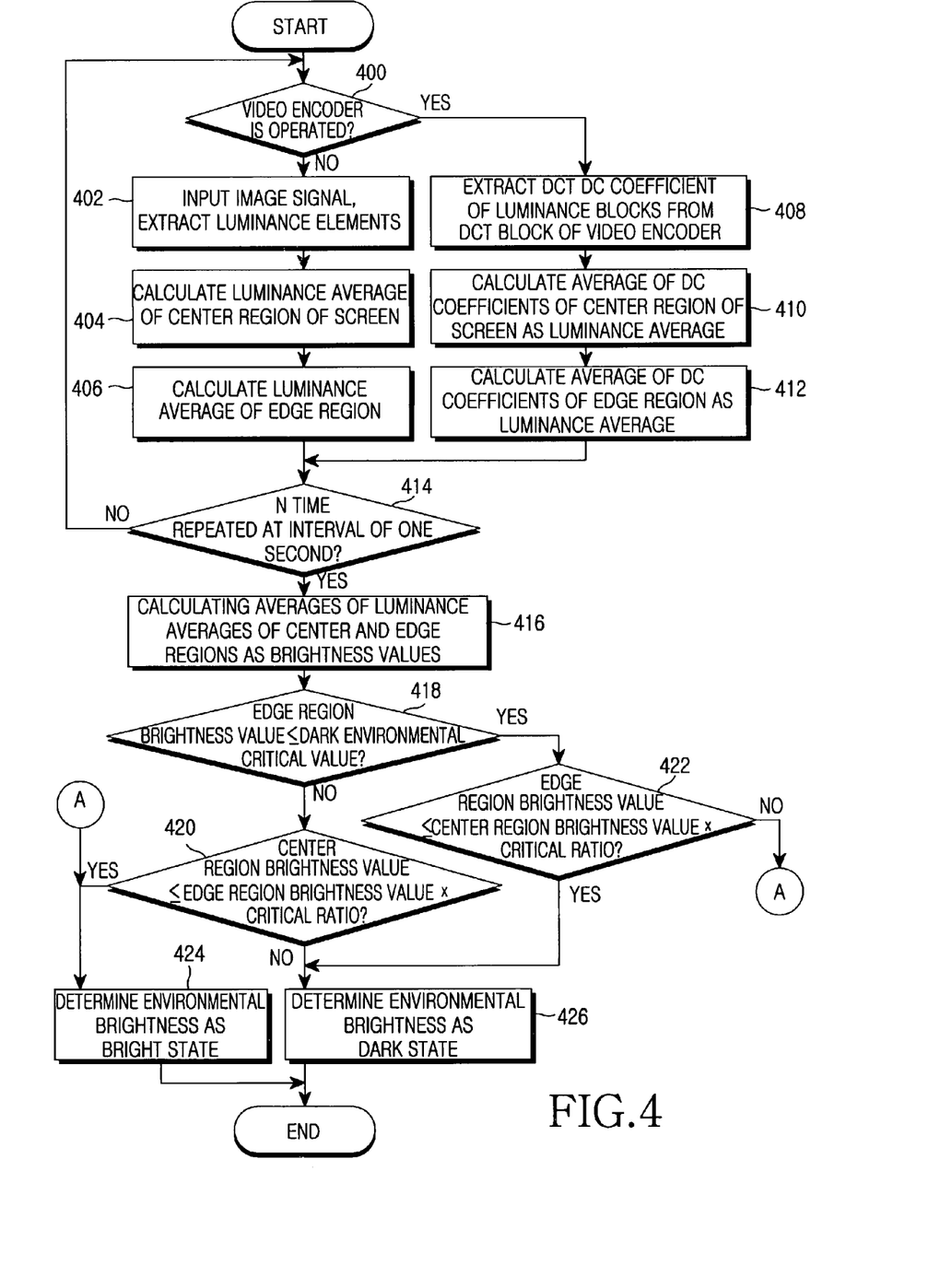
FIG. 4 is a flowchart illustrating a process for determining environmental brightness in order to control display brightness in accordance with the preferred embodiment of the present invention.

Referring to FIG. 4, shown is a flowchart of the determination process 400–426 of the environmental brightness sensor 112. Tthe environmental brightness sensor 112 respectively calculates the luminance average of the center region 302 of the photographed screen 300 corresponding to the AGC reference region 202 and the luminance average of the edge region 304 as the brightness values from the image signal generated by photographing of the camera 100 in steps 400 to 416.

At this time, the brightness values of the center and edge regions 302 and 304 are determined by directly receiving the image signal from the camera 100, or processed by extracting the first DCT coefficients of luminance blocks among the chrominance blocks and luminance blocks which belong to the center region 302 and the edge region 304, namely DC (Direct Current) coefficients corresponding to (0,0) coordinates values after the DCT block 104 performs the DCT on the image data in the video encoder of the video CODEC 102 and before a quantization block starts an operation. In detail, when the mobile communication terminal of FIG. 1 transmits an image to the other party, the video CODEC 102 compresses and encodes the image generated by the camera 100, and transmits the encoded image. Here, the compression and encoding process includes the DCT process, and the DC coefficient after the DCT shows the entire compressed energy and phase of the corresponding DCT image block. One block DCT image has a size of 8×8 pixels and 64 DCT coefficients. The DC coefficient of the 64 DCT coefficients implies an average of the corresponding DCT image block. Accordingly, the user does not need to calculate the average. In addition, only 1/64 pixel is sampled among all of the screen pixels, thereby remarkably reducing computational complexity.

However, the DCT DC coefficient can be used when the video encoder of the video CODEC 102 is operated. Therefore, the operation state of the video encoder is confirmed in step 400 of FIG. 4. When the video encoder is not operated, the routine goes to step 402. In the case that the video encoder is operated, the routine goes to step 408. The luminance elements are extracted from the image signal generated by photographing of the camera 100 in step 402, and the luminance averages of the center region 302 and the edge region 304 are calculated in the screen composed of the luminance elements in steps 404 to 406. In addition, the DCT DC coefficients of the luminance blocks are extracted from the DCT block 104 of the video encoder in step 408, and the luminance averages are calculated in steps 410 to 412 by adding the averages of the DC coefficients of the luminance blocks which belong to the center region 302 and the edge region 304 among the extracted DCT DC coefficients of the luminance blocks, namely all of the DC coefficients of the luminance blocks, and by dividing the result value by a number of the luminance blocks. Thereafter, whether the luminance average is calculated at an interval of one second N times is confirmed in step 414. When calculation of the luminance average is not repeated N times, the routine goes to step 400. If it is repeated N times, the routine goes to step 416. Accordingly, the averages of the N luminance averages of the center region 302 and the edge region 304 are respectively calculated and used as the brightness values of the center region 302 and the edge region 304. Here, the averages of the luminance averages obtained by repeating the procedure N times are calculated in order to prevent misdetermination of the environmental brightness due to temporary variations of the environmental brightness or movement of the mobile communication terminal.

Thereafter, the environmental brightness sensor 112 compares the brightness value of the edge region with a previously-set dark environmental critical value, compares the brightness value of the center region 302 with the brightness value of the edge region 304 according to the comparison result, and determines the environment brightness as a bright or dark state in steps 418 to 426. Here, the brightness value of the center region 302 and the brightness value of the edge region 304 are varied by the AGC of the camera 100 as well as the relative positions of the screen of the LCD 110, the subject and the user. When the bright light source exists, these values are also varied by the relative position of the light source. Therefore, in order to prevent misdetermination of the environmental brightness due to the aforementioned factors, the bright value of the edge region 304 is compared with the dark environmental critical value, and the brightness value of the center region 302 is compared with the brightness value of the edge region 304 according to the result. Steps 418 to 426 will be described in detail further below.

Figure 5:
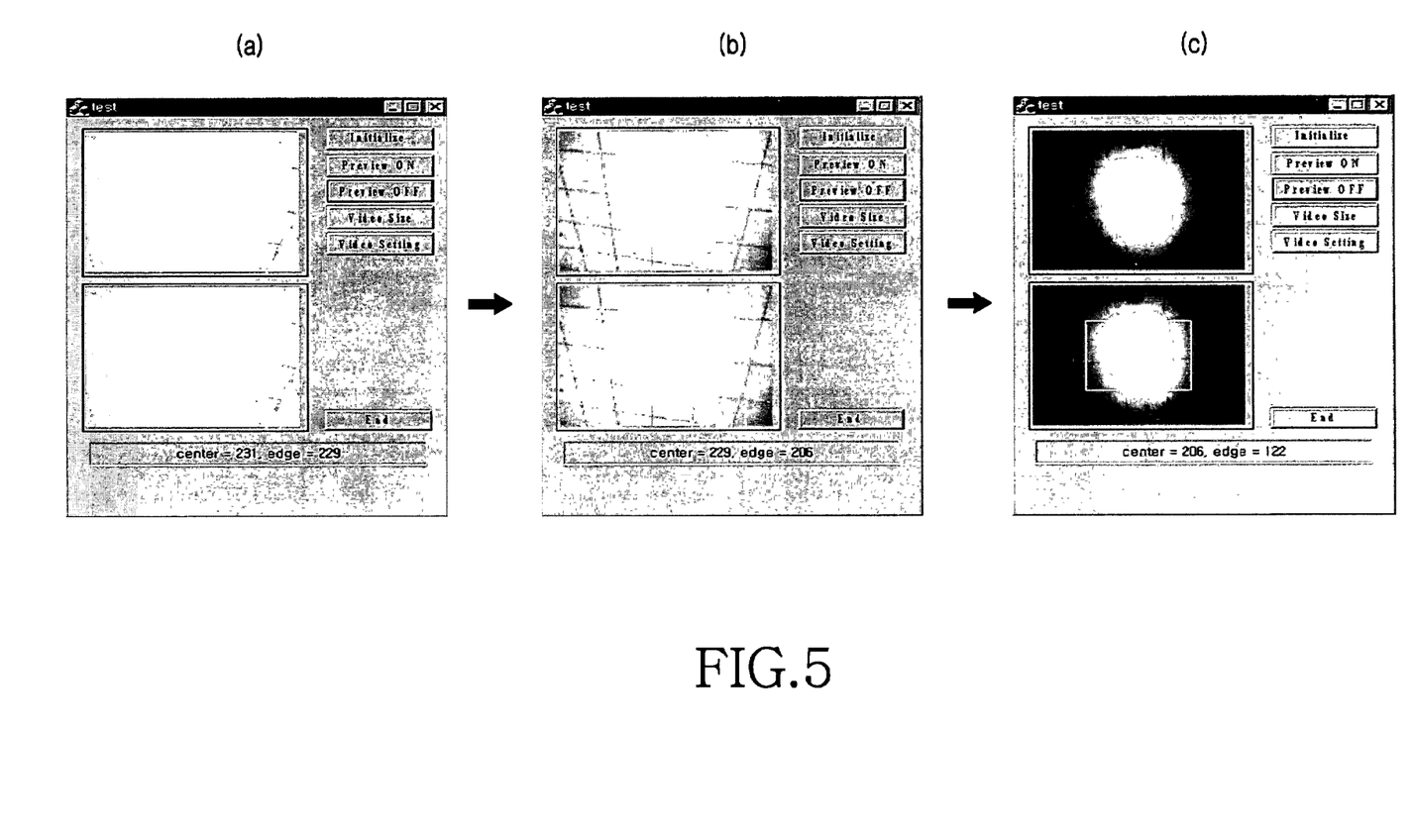
FIG. 5 is an exemplary diagram illustrating the screen in a simulation of the AGC process of the camera in a bright environment in accordance with the preferred embodiment of the present invention.
Figure 6:
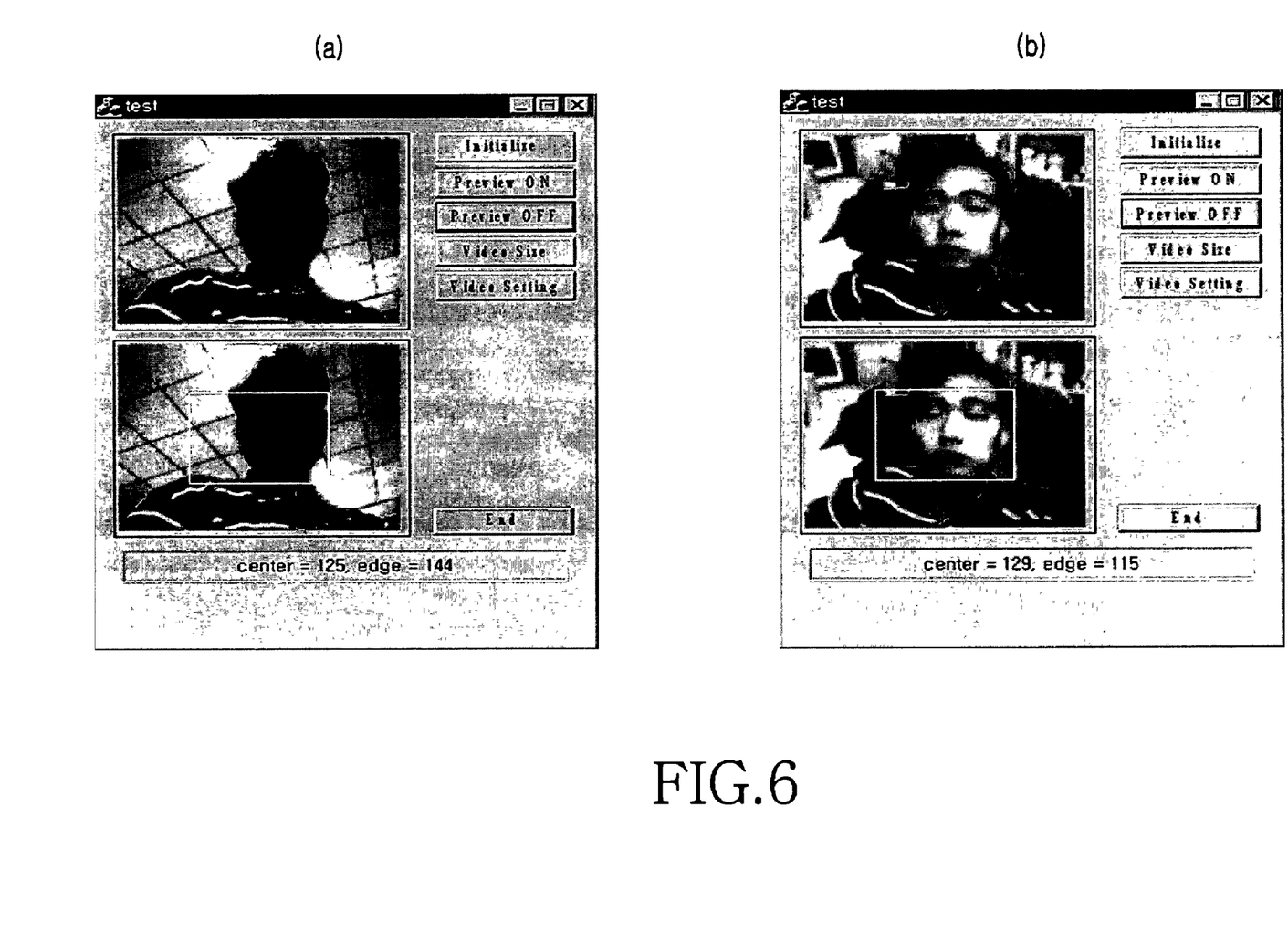
FIG. 6 is an exemplary diagram illustrating the screen in a backlight state simulation and an opposite state simulation in the bright environment in accordance with the preferred embodiment of the present invention.
Figure 7:
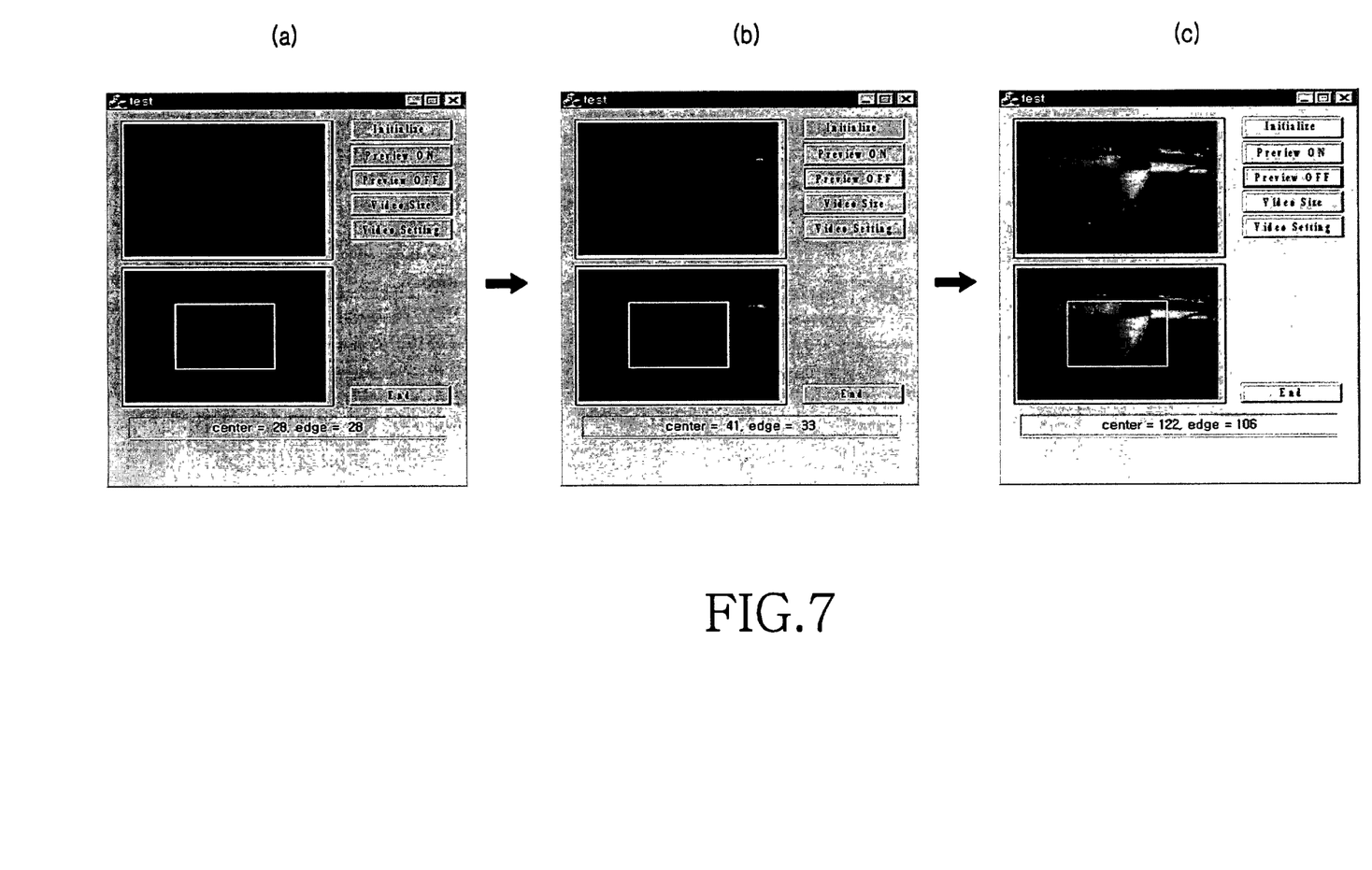
FIG. 7 is an exemplary diagram illustrating the screen in a simulation of the AGC process of the camera in a dark environment in accordance with the preferred embodiment of the present invention.

For reference, the simulation result of the brightness value of the center region 302 and the brightness value of the edge region 304 which are obtained by the AGC process of the camera 100 and the surrounding environment will now be described. In this simulation, a camera is MPC-M10 which is a color USB PC camera sold at market by Samsung Electro-mechanics Co., Ltd., and a menu screen of the simulation is formed as shown in FIGS. 5 to 7. In the two screen windows of the menu screen of FIGS. 5 to 7, the upper screen window displays the original images in a real time, and the lower screen window displays the luminance images in a real time. The rectangular region indicates the center region 302 of FIG. 3, and the remaining region is the edge region 304. In addition, the values indicated by 'center' and 'edge' are the luminance averages, namely the brightness values of the center region 302 and the edge region 304 which are obtained by the above-described steps 400 to 416. Here, the luminance values are represented by 8 bit data, 0 to 255. The highest brightness value is approximate to 255, but the lowest brightness value approximate to 0 is not obtained even by covering the lens of the camera 100 with hands.

On the other hand, the environmental brightness is roughly divided into the bright environment and the dark environment. However, a backlight state and an opposite state must be considered in the bright environment.

FIG. 5 is an exemplary diagram illustrating the screen in the simulation of the AGC process when the camera 100 photographs a fluorescent light hanging from the ceiling. The center region and the edge region of the very bright screen have extremely similar luminance as shown in FIG. 5(a), just after the camera 100 starts the photographing operation. Then, the center region and the edge region have gradual luminance differences according to the AGC as shown in FIG. 5(b). As a result, the user can confirm the subject on the screen as shown in FIG. 5(c). Here, the center region and the edge region have great luminance differences. The process of FIGS. 5(a) to 5(c) takes about one second. Referring to FIG. 5(c), the brightness value of the center region is '206' so that the user can clearly see the shape of the fluorescent light, but the brightness value of the edge region is only '122' due to the excessively-closed iris so that the ceiling included in the edge region is very dark.

FIG. 6(a) shows the backlight state. Since the subject is positioned with his/her back to the light, his/her face looks dark. The iris is opened by the AGC to brighten the face, and thus the edge region becomes brighter. The brightness value of the center region '125' is smaller than that of the edge region '144'. The experiment result always says that the brightness value of the center region is smaller than that of the edge region. In addition, the camera 100 and the LCD 110 of the mobile communication terminal turn toward the light. In this case, the environmental brightness is determined as the bright state. Therefore, the LCD light can be always turned off. FIG. 6(b) shows the opposite state to FIG. 6(a). The camera 100 is positioned with its back to the light source, and thus has a shadow. When one faces the light, his/her face looks bright. The iris is closed to darken the face, and thus the environment becomes dark. Here, the brightness value of the center region '129' is not that different from the brightness value of the edge region '115'. Since he/she sees the light source, the camera 100 looks darker due to the brightness difference. As described above, the camera 100 and the LCD 110 of the mobile communication terminal are positioned with their backs to the light, the environmental brightness must be determined as the dark state to turn on the LCD light. The center region and the edge region have little difference in the simulation environment, namely in a room. However, the user must turn on the light with his/her hands covering the LCD 110 outdoors in a bright day.

FIG. 7 is an exemplary diagram illustrating the screen in the simulation of the AGC process when the camera 100 photographs a cup in the dark environment. The center region and the edge region of the very dark screen have extremely similar luminance as shown in FIG. 7(a), just after the camera 100 starts the photographing operation. Then, the center region and the edge region have gradual luminance differences according to the AGC as shown in FIG. 7(b). Accordingly, the user can confirm the subject on the screen as shown in FIG. 7(c). Here, the center region and the edge region have great luminance differences. The process of FIGS. 7(a) to 7(c) takes about one second. Referring to FIG. 7(c), the brightness value of the center region '122' is greater than that of the edge region '106'.

The simulation results of FIGS. 5 to 7 will now be summarized. In the bright environment, the center region and the edge region always have the brightness values over 100. The brightness value of the edge region over 140 implies almost 99% bright state. However, the brightness value of the edge region is often below 140 in spite of the bright state. In addition, the brightness value is always less than 110 in the dark environment. As described above, it can also be maintained in the bright environment. When the brightness value of the edge region is below 80, the environmental brightness is deemed as the dark state by almost 99%. But, the brightness value of the edge region is often over 80 even in the dark state. The center region has a higher brightness value than the edge region. Generally, it is reasonable that the brightness value of the edge region below 95 means the dark environment.

According to the simulation result, a predetermined brightness value, for example '120' is set up as a dark environmental critical value, and the brightness value of the edge region is compared with the dark environmental critical value. When the brightness value of the edge region is greater than the dark environmental critical value, the environmental brightness is mostly deemed as the bright state. However, if the center region 302 is very dark, the edge region 304 may be misjudged as the bright state. Accordingly, the brightness value of the center region is compared with a value obtained by multiplying the brightness value of the edge region by a critical ratio greater than '0' and less than '1' (abbreviated as 'first reference value'). When the brightness value of the edge region is not higher than the dark environmental critical value, the environmental brightness is mostly deemed as the dark state. However, the edge region 304 may be darkened due to the AGC function of the camera 100 on the center region 302. Thus, the brightness value of the edge region is compared with a value obtained by multiplying the brightness value of the center region by the aforementioned critical ratio (abbreviated as 'second reference value'). The critical ratio and the dark environmental critical value are set up according to the special properties of the camera 100 including the brightness and resolution.

Steps 418 to 426 proceed a process for determining the environmental brightness as the bright or dark state according to the comparison result. Firstly, the brightness value of the edge region 304 is compared with the dark environmental critical value in step 418. Here, when the brightness value of the edge region 304 is greater than the dark environmental critical value, the brightness value of the center region 302 is compared with the first reference value in step 420. In the case that the brightness value of the edge region 304 is not greater than the dark environmental critical value, the brightness value of the edge region 304 is compared with the second reference value in step 422. As the comparison result, when the brightness value of the center region 302 is greater than the first reference value, the environmental brightness is determined as the dark state in step 426, and when it is not greater than the first reference value, the environmental brightness is determined as the bright state in step 424. In addition, when the brightness value of the edge region 304 is greater than the second reference value, the environmental brightness is determined as the bright state in step 424, and when it is not greater than the second reference value, the environmental brightness is determined as the dark state in step 426.

The comparison and determined results are shown in following Table 1:

| | Cases | Judgment Result |
|---|---|---|
| 1 | Edge region brightness value ≦ dark environmental critical value, and edge region brightness value ≦ center region brightness value × critical rate | Dark state |
| 2 | Edge region brightness value ≦ dark environmental critical value, and edge region brightness value > center region brightness value × critical rate | Bright state |
| 3 | Edge region brightness value > dark environmental critical value, and center region brightness value ≦ edge region brightness value × critical rate | Bright state |
| 4 | Edge region brightness value > dark environmental critical value, and center region brightness value > edge region brightness value × critical rate | Dark state |

In Case 1 of Table 1, the brightness value of the edge region 304 is less than the dark environmental critical value, and thus the environmental brightness is supposed to be the dark state. Here, the brightness values of the edge region 304 and the center region 302 are compared to prove that the current state is the dark state. In Case 2, the brightness value of the edge region 304 is less than the dark environmental critical value, and thus the environmental brightness is supposed to be the dark state. After the brightness values of the edge region 304 and the center region 302 are compared, it proves that the environment is not dark but the center region 302 is excessively bright. That is, the edge region 304 is very darkened due to the AGC function of the camera 100 on the center region 302. In Case 3, the brightness value of the edge region 304 is greater than the dark environmental critical value, and thus the environmental brightness is supposed to be the bright state. Here, the brightness values of the edge region 304 and the center region 302 are compared to prove that the current state is the bright state. In Case 4, the brightness value of the edge region 304 is greater than the dark environmental critical value, and thus the environmental brightness is supposed to be the bright state. After the brightness values of the edge region 304 and the center region 302 are compared, it proves that the edge region 304 is misdetermined as the bright state because the center region 302 is excessively dark.

It is thus possible to determine the environmental brightness to appropriately control the display brightness according to the variations of the environmental brightness in the mobile communication terminal including the camera having the AGC function.

On the other hand, the determination result of the environmental brightness obtained by the environmental brightness sensor 112 is provided to the brightness controller 106 and the LCD light driver 114. The brightness controller 106 connected between the video CODEC 102 and the LCD driver 108 controls the brightness of the image signal transmitted from the video CODEC 102 to the LCD 110, namely the image signal for driving the LCD 110 by the LCD driver 108 according to the environmental brightness determination result of the environmental brightness sensor 112. For example, the brightness controller 106 automatically controls the brightness, contrast and colors of the LCD screen according to the determined environmental brightness, as in the aforementioned Korea Patent Publication No. 1999-000122.

However, the display brightness of the LCD 110 is preferably controlled in pixel units, not the whole brightness of the image to directly correspond to the environmental brightness.

Figure 8:
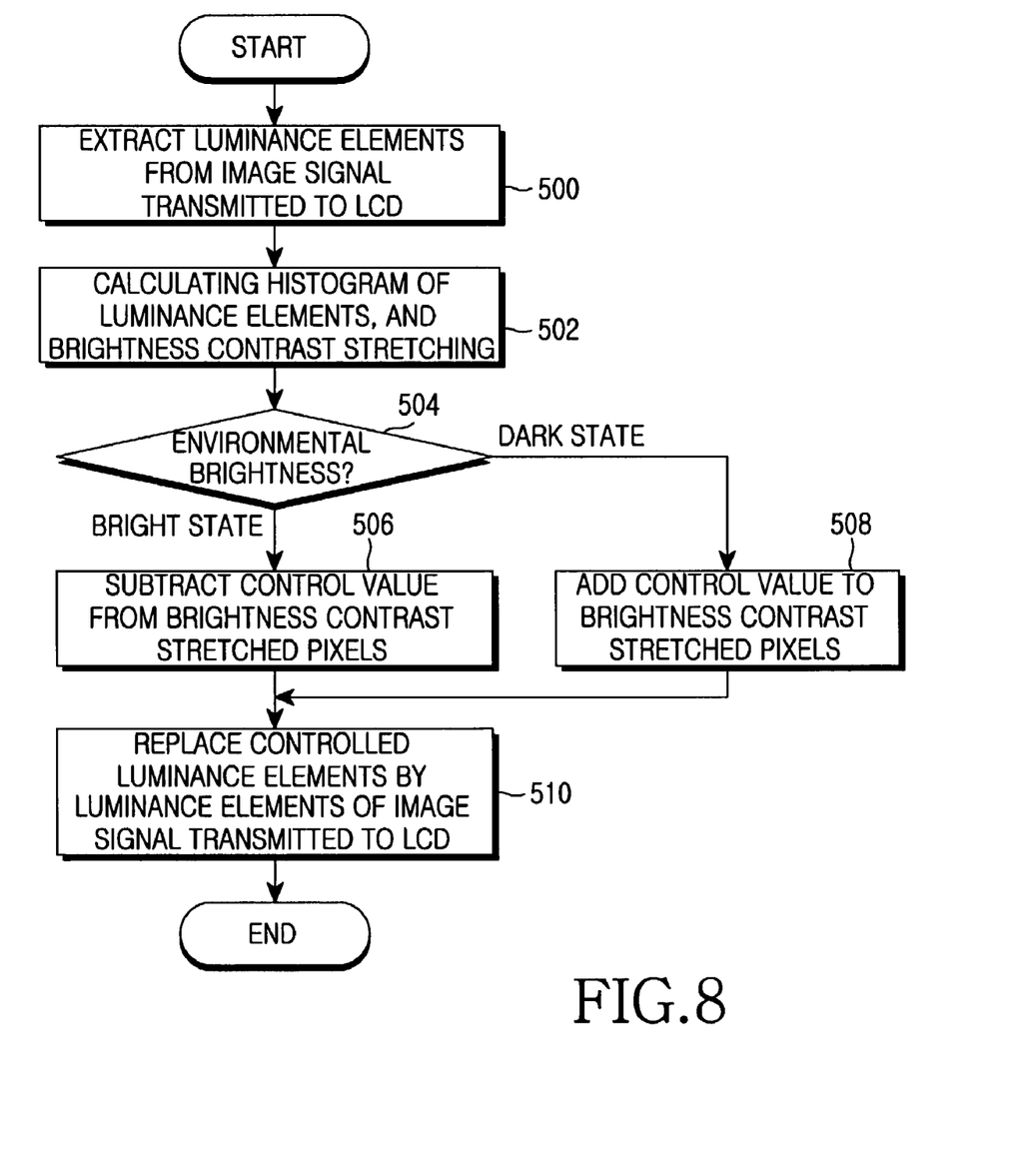
FIG. 8 is a flowchart illustrating a process for controlling the display brightness in accordance with the preferred embodiment of the present invention.
Figure 9:
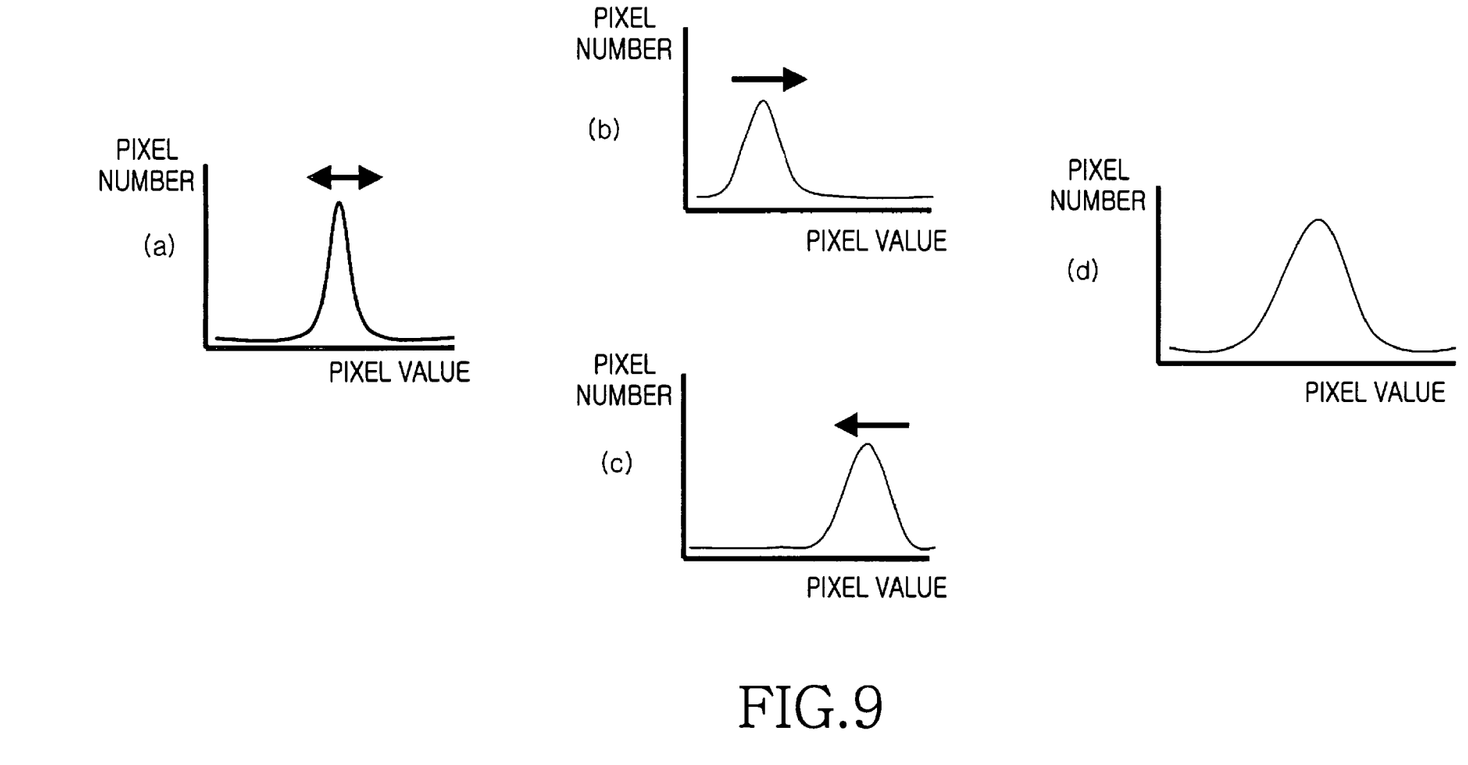
FIG. 9 is an exemplary diagram illustrating a process for controlling the brightness in accordance with the preferred embodiment of the present invention.

FIG. 8 is a flowchart illustrating a process 500–510 for controlling the display brightness by the brightness controller 106 in order to adjust the display brightness in pixel units on the basis of the environmental brightness determination result of the environmental brightness sensor 112 in accordance with the preferred embodiment of the present invention. Referring to FIG. 8, luminance elements are extracted from an image signal which will be transmitted to the LCD 110, namely the image signal outputted from the video CODEC 102 in step 500. A histogram of the luminance elements is calculated as shown in FIG. 9(a), and brightness contrast stretching is performed in step 502. The brightness is controlled by adding or subtracting a previously-set control value to/from the brightness contrast stretched pixel values according to the environmental brightness determined by the environmental brightness sensor 112 in steps 504 to 510. When the environmental brightness is determined as the bright state, the control value is subtracted from the brightness contrast stretched pixel values as shown in FIG. 9(c), and when the environmental brightness is determined as the dark state, the control value is added to the brightness contrast stretched pixel values as shown in FIG. 9(b). The brightness-controlled luminance elements are replaced by the luminance elements of the image signal which will be transmitted to the LCD 110, and transmitted to the LCD driver 108.

Therefore, the display brightness of the LCD 110 is controlled according to the variations of the environmental brightness in the mobile communication terminal including the camera having the AGC function.

On the other hand, the LCD light driver 114 turns on/off the light device 116 or adjusts the light brightness according to the environmental brightness determination result of the environmental brightness sensor 112. The light device 116 generally provides a front light and/or back light for the LCD 110.

In accordance with the present invention, the environmental brightness can be determined to appropriately control the display brightness according to the variations of the environmental brightness in the mobile communication terminal including the camera having the AGC function. In addition, the display brightness can be appropriately controlled using the same.

While the invention has been shown and described with reference to a certain preferred embodiment thereof, it will be understood by those skilled in the art that various changes in form and details may be made therein without departing from the spirit and scope of the invention as defined by the appended claims. Especially, controlling the display brightness or light of the LCD is exemplified in the above embodiment. However, the present invention can be applied to controlling according to the environmental brightness in the same manner, as the light emitting diodes for illuminating a keypad are automatically on/off according to the environmental brightness. As a result, the scope of the invention should not be determined by the above-described embodiment, but the claims and equivalents thereof.

What is claimed is:

1. A method for determining environmental brightness to control display brightness in a mobile communication terminal including a camera having an automatic gain control (AGC) function for automatically controlling light so that a luminance average of an image for an AGC reference region set up in a photograph screen can exist within a predetermined range, the method comprising the steps of:
   calculating a luminance average of a center region of the photographed screen corresponding to the reference region and a luminance average of an edge region outside of the center region as brightness values from an image signal generated by photographing of the camera; and
   comparing the brightness value of the edge region with a previously-set dark environmental critical value, comparing the brightness value of the center region with the brightness value of the edge region according to the comparison results, and determining that the environmental brightness is one of the bright state and the dark state.

2. The method as claimed in claim 1, wherein the step for determining the environmental brightness comprises the steps of:
   comparing the brightness value of the edge region with the dark environmental critical value;
   comparing the brightness value of the center region with a first reference value obtained by reducing the brightness value of the edge region by a previously-set critical ratio when the brightness value of the edge region is greater than the dark environmental critical value, and comparing the brightness value of the edge region with a second reference value obtained by reducing the brightness value of the center region by the critical ratio when the brightness value of the edge region is less than or equal to the dark environmental critical value;
   determining the environmental brightness as the dark state when the brightness value of the center region is greater than the first reference value, and determining the environmental brightness as the bright state when the brightness value of the edge region is less than or equal to the first reference value; and
   determining the environmental brightness as the bright state when the brightness value of the edge region is greater than the second reference value, and determining the environmental brightness as the dark state when the brightness value of the center region is less than or equal to the second reference value.

3. The method as claimed in claim 2, wherein the critical ratio is greater than '0' and less than '1'.

4. The method as claimed in claim 1, wherein the step for calculating the brightness value comprises the steps of:
   extracting luminance elements from an image signal generated by performing a photographing operation of the camera; and
   calculating luminance averages of the center region and the edge region in the screen composed of the extracted luminance elements.

5. The method as claimed in claim 1, wherein the step for calculating the brightness value comprises the steps of:
   extracting discrete cosine transform direct current (DCT DC) coefficients of luminance blocks from a DCT block of a video encoder for compressing and encoding an image signal generated by performing a photographing operation of the camera; and
   calculating averages of the DC coefficients of the center region and the edge region as the luminance averages among the extracted DCT DC coefficients of the luminance blocks.

6. The method as claimed in claim 1, wherein the step for calculating the brightness value comprises the steps of:
   confirming the operation of a video encoder for compressing and encoding an image signal generated by performing a photographing operation of the camera;
   extracting luminance elements from the image signal generated by performing the photographing operation of the camera, when the video encoder is not operated;
   calculating luminance averages of the center region and the edge region in the screen composed of the extracted luminance elements;
   extracting discrete cosine transform direct current (DCT DC) coefficients of luminance blocks from a DCT block of the video encoder, when the video encoder is operated; and
   calculating averages of the DC coefficients of the center region and the edge region as the luminance averages among the extracted DCT DC coefficients of the luminance blocks.

7. The method as claimed in claim 1, wherein the center region is formed at the center portion of the screen and comprises an area equal to a quarter of the screen area.

8. A method for controlling display brightness in a mobile communication terminal including a camera having an automatic gain control (AGC) function for automatically controlling light so that a luminance average of an image for an AGC reference region set up in a photograph screen can exist within a predetermined range, comprising the steps of:
   calculating a luminance average of a center region of the photograph screen corresponding to the reference region and a luminance average of an edge region outside of the center region as brightness values from an image signal generated by performing a photographing operation of the camera;
   comparing the brightness value of the edge region with a previously-set dark environmental critical value, comparing the brightness value of the center region with determining the brightness value of the edge region according to the comparison results, and determining that the environmental brightness is one of the bright state and the dark state;
   extracting luminance elements from an image signal which will be transmitted to the display;
   calculating a histogram of the luminance elements, and performing brightness contrast stretching;
   controlling the display brightness by adding or subtracting a previously-set control value to/from the brightness contrast stretched pixels according to the determined environmental brightness; and
   replacing the brightness-controlled luminance elements by the luminance elements of the image signal which will be transmitted to the display.

9. The method as claimed in claim 8, wherein the step for controlling the brightness subtracts the control value from the brightness contrast stretched pixels when the environmental brightness is determined as the bright state, and adds the control value to the brightness contrast stretched pixels when the environmental brightness is determined as the dark state.

10. The method as claimed in claim 8, wherein the step for determining the environmental brightness comprises the steps of:

comparing the brightness value of the edge region with the dark environmental critical value;

comparing the brightness value of the center region with a first reference value obtained by reducing the brightness value of the edge region by a previously-set critical ratio when the brightness value of the edge region is greater than the dark environmental critical value, and comparing the brightness value of the edge region with a second reference value obtained by reducing the brightness value of the center region by the critical ratio when the brightness value of the edge region is less than or equal to the dark environmental critical value;

determining the environmental brightness as the dark state when the brightness value of the center region is greater than the first reference value, and determining the environmental brightness as the bright state when the brightness value of the edge region is less than or equal to the first reference value; and determining the environmental brightness as the bright state when the brightness value of the edge region is greater than the second reference value, and determining the environmental brightness as the dark state when the brightness value of the center region is less than or equal to the second reference value.

11. The method as claimed in claim 10, wherein the critical ratio is greater than '0' and less than '1'.

12. The method as claimed in claim 9, wherein the step for determining the environmental brightness comprises the steps of:

comparing the brightness value of the edge region with the dark environmental critical value;

comparing the brightness value of the center region with a first reference value obtained by reducing the brightness value of the edge region by a previously-set critical ratio when the brightness value of the edge region is greater than the dark environmental critical value, and comparing the brightness value of the edge region with a second reference value obtained by reducing the brightness value of the center region by the critical ratio when the brightness value of the edge region is less than or equal to the dark environmental critical value;

determining the environmental brightness as the dark state when the brightness value of the center region is greater than the first reference value, and determining the environmental brightness as the bright state when the brightness value of the edge region is less than or equal to the first reference value; and determining the environmental brightness as the bright state when the brightness value of the edge region is greater than the second reference value, and determining the environmental brightness as the dark state when the brightness value of the center region is less than or equal to the second reference value.

13. The method as claimed in claim 12, wherein the critical ratio is greater than '0' and less than '1'.

* * * * *